United States Patent
Sakou et al.

[11] Patent Number: 5,912,546
[45] Date of Patent: Jun. 15, 1999

[54] BATTERY CHARGER FOR BATTERY PACKS

[75] Inventors: Masahiko Sakou; Masatoshi Sugiura; Yoshiharu Shimizu, all of Anjo, Japan

[73] Assignee: Makita Corporation, Anjo, Japan

[21] Appl. No.: 08/972,196

[22] Filed: Nov. 18, 1997

[30] Foreign Application Priority Data

Nov. 18, 1996 [JP] Japan ................................ 8-323392

[51] Int. Cl.$^6$ ................................................ H01M 10/46
[52] U.S. Cl. .......................................... 320/134; 320/150
[58] Field of Search ................................ 320/107, 110,
320/112, 132, 134, 136, 150, 154, FOR 101,
FOR 129, FOR 134, FOR 147, DIG. 13

[56] References Cited

U.S. PATENT DOCUMENTS

| | | | |
|---|---|---|---|
| 4,942,352 | 7/1990 | Sano | 320/2 |
| 5,254,933 | 10/1993 | Lin | 320/35 |
| 5,289,104 | 2/1994 | Lin | 320/154 |

FOREIGN PATENT DOCUMENTS 35 11 988 A1  10/1985  Germany .
58-193574     12/1983  Japan .
61-202129     12/1986  Japan .

*Primary Examiner*—Edward H. Tso
*Attorney, Agent, or Firm*—Pillsbury Madison & Sutro LLP

[57] ABSTRACT

A protection arrangement for a battery charger of the type used to charge battery packs used for electromotive tools. A self-holding protector is arranged in the neighborhood of an inserting hole of the battery charger for receiving a storage battery pack 50 to be charged. This self-holding protector element includes two elements electrically connected in parallel. One of these two elements is a bimetal which opens when it heats or flows too much current. The other of the two elements is a positive characteristic thermistor (PCT) which generates heat when a current flows through it. When a battery pack being charged becomes over-charged and heats, the bimetal element of the protector opens, and charging current stops flowing. When the bimetal element opens, electric current flows through the PCT. This current causes the PCT to heat and maintain the bimetal element in its open condition. When the battery pack being charged short-circuits, and a large current flows through it, the bimetal element opens and charging current is interrupted in the same way.

3 Claims, 5 Drawing Sheets

BATTERY CHARGER FOR BATTERY PACKS

BACKGROUND OF THE INVENTION

1. Field of Invention

This invention relates generally to battery chargers. More specifically, the invention relates to battery chargers of the non-constant-current type.

2. Description of Related Art

It is known to use storage batteries to power electromotive tools. Such tools are used in a repetitive fashion and the storage batteries are cycled often through their charge and discharge cycle. It is also known to rapidly charge such a storage battery by flowing a large current through it. Battery chargers of this type are known. Such battery chargers detect a fully-charged state of a storage battery pack by various arrangements.

One such known arrangement uses a thermostat which is installed in a storage battery pack for detecting the full charge. When charging is complete, charging current causes the battery pack to heat. When the temperature reaches a predetermined point, the thermostat opens to interrupt charging. A problem associated with the operation of this type of battery charger is that the thermostat sometimes breaks down at the moment when terminals of the storage battery pack short-circuit.

When the battery charger cannot detect the heat of the storage battery pack due to a failure of the thermostat of the battery pack, continued charging current may cause the storage battery to break down. Therefore even charging systems of type that use a thermostat also use a thermal-detecting device, such as a thermal-fuse in the battery charger as a safety device.

When a storage battery pack including a plurality of storage batteries is used repeatedly, one or more of the storage batteries may eventually short-circuit. When a short-circuit occurs in the storage battery, a battery charger that is not of the constant-current type flows a large current, causing damage to the battery charger. Therefore, an element for detecting the over-current, such as a current fuse or a hand-operated reversion type over-current relay is installed in the battery charger.

Thus, known battery charges of the non-constant current type often have separate elements for detecting a temperature rise due to over-charging and for detecting over-current. This arrangement is complicated to construct. When a current fuse is used as the element for protecting against over-current, it is necessary to keep extra fuses on hand to change them each time it becomes necessary. When a hand-operated reversion type over-current relay is used, it is necessary for an operator to reset a reversion switch whenever the relay operates.

SUMMARY OF THE INVENTION

It is accordingly an object of the present invention to provide a battery charger which can prevent over-charging due to a failed thermostat in a storage battery pack and can prevent over-current due to a short circuit in one or more of the storage batteries of the battery pack surely and accurately.

The present invention provides a battery charger meeting this objective. The battery charger according to this invention has a body member that defines an inserting hole for inserting a storage battery pack having an input terminal, and an output terminal arranged in the inserting hole for connecting with the input terminal of the storage battery pack. It includes a rectifier power supply for rectifying commercial power and providing a direct current of predetermined voltage for charging a battery pack inserted into the inserting hole. The charger applies the direct current voltage to the output terminal of storage battery pack to charge it.

A self-holding type protector is placed near the inserting hole. This protector has parallel connected first and second elements, the first element is caused to disconnect either based on temperature or electric current. The second element causes the disconnect to be maintained by a small electric current. The self-holding type protector is connected between the commercial power supply and the output terminal.

The self-holding type protector is placed in the neighborhood of the inserting hole. Therefore, when a storage battery pack generates heat as a result of an over-charge, the first element of the self-holding type protector causes charging current to stop flowing through it. When the first element becomes electrically open so that current no longer flows through it, current flows through the second element of the self-holding type protector, and it maintains the off-condition of the first element. In the same way, when a large current flows through the storage battery pack due to short-circuit of the storage battery, the first element of the self-holding type protector is disconnected to stop power to the storage battery pack. The current to the self-holding type protector can be stopped by removing the storage battery pack from the inserting hole. Therefore, the first element can be reset or reverted.

The self-holding type protector is utilized which stops electric current by the over-current and the temperature. Therefore, it doesn't need to set up an element for the over-current protection and an element for the temperature protection separately, and structure becomes simple, and can be constructed within moderate price. Furthermore, it can be reset by only removing a storage battery pack from the inserting hole without operating a reversion switch, different from the over current relay for the over-current protection.

The self-holding type protector may be placed at the bottom of the inserting hole of the storage battery pack. Thus, the heat generated in the storage battery pack efficiently conducts to the self-holding type protector so that the self-holding type protector can be operated in a short time.

The self-holding type protector may be placed along a side wall of the inserting hole of the storage battery pack. Thus, the heat generated in the storage battery pack efficiently conducts to the self-holding type protector so that the self-holding type protector can be operated in a short time.

BRIEF DESCRIPTION OF THE DRAWINGS

The present invention is illustrated in the accompany drawings, in which.

DETAILED DESCRIPTION OF THE PREFERRED EMBODIMENTS

Embodiments of this invention will now be described in detail with reference to the accompanying drawings.

Figure 1:
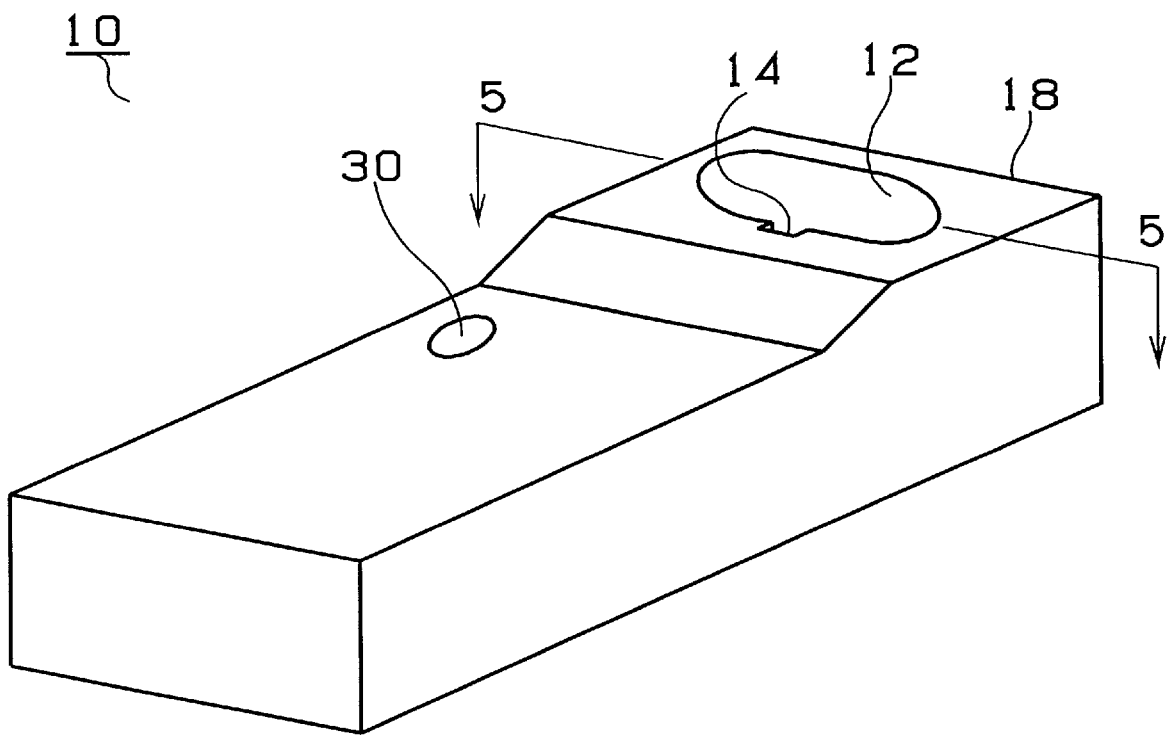
FIG. 1 is a perspective diagram of a battery charger according to embodiments of this invention.
Figure 2:
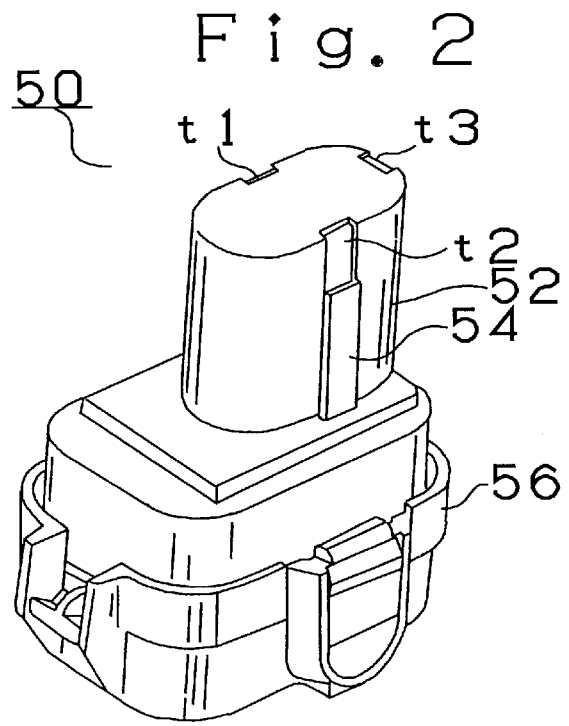
FIG. 2 is a perspective diagram of a storage battery pack according to embodiments of this invention.
Figure 3:
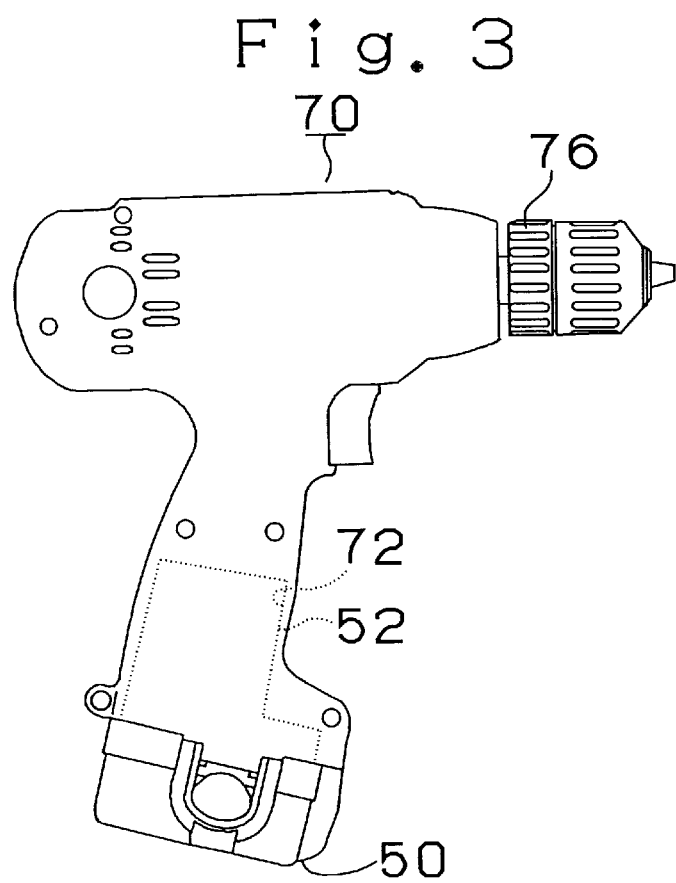
FIG. 3 is a perspective diagram of a battery drill using a storage battery pack shown in FIG. 1.

FIG. 1 shows a battery charger 10 according to a first embodiment of this invention. FIG. 2 shows a storage battery pack 50 that is charged by battery charger 10. FIG. 3 shows a battery-powered drill 70 powered by the storage battery pack 50.

As shown in FIG. 2, storage battery pack 50 contains a storage battery (not visible in the figure). Battery pack 50 has a generally cylinder-shaped inserting part 52 and a pillar-shaped base part 56. A key-shaped key part 54 is formed by the side of the inserting part 52. At the top of inserting part 52, there is a first input terminal t1 which is internally connected to a positive terminal of the storage battery(not visible). A second input terminal t2 is internally connected to a negative terminal of the storage battery. A third terminal t3 is connected to the negative terminal through a thermostat (not visible).

Battery charger 10, shown in FIG. 1, has a body member that defines an inserting hole 12 for receiving the inserting part 52 of storage battery pack 50. A key groove 14 is formed in a side wall of the inserting hole 12 for receiving key part 54 of battery pack 50. The inserting hole 12 is defined by a plastic molded casing 18 which forms the body of battery charger 10. Key part 54 of storage battery pack 50 mates with key groove 14 of inserting hole 12 of battery charger 10. Therefore, the battery pack can only be installed with a correct orientation into the charger. At bottom part of inserting hole 12, there are first, second and third output terminals T1, T2, T3 (not shown in the figure) which connect to the first, second and third terminals t1, t2, t3, respectively of battery pack 50. A light emitting diode (LED) 30 indicates a charging condition of a battery pack 50 installed in battery charger 10.

As shown in FIG. 3, a battery-powered drill 70 has an inserting hole 72 for receiving the inserting part 52 of battery pack 50. Electric current generated by battery pack 50, flowing via terminals t1 and t2, powers a motor (not shown) in drill 70 which, in turn, drives a drill chuck 76. Drill 70 can be used continuously by exchanging battery packs 50, as needed. The battery charger 10 can rapidly charge a 'used' battery pack 50.

Figure 6A:
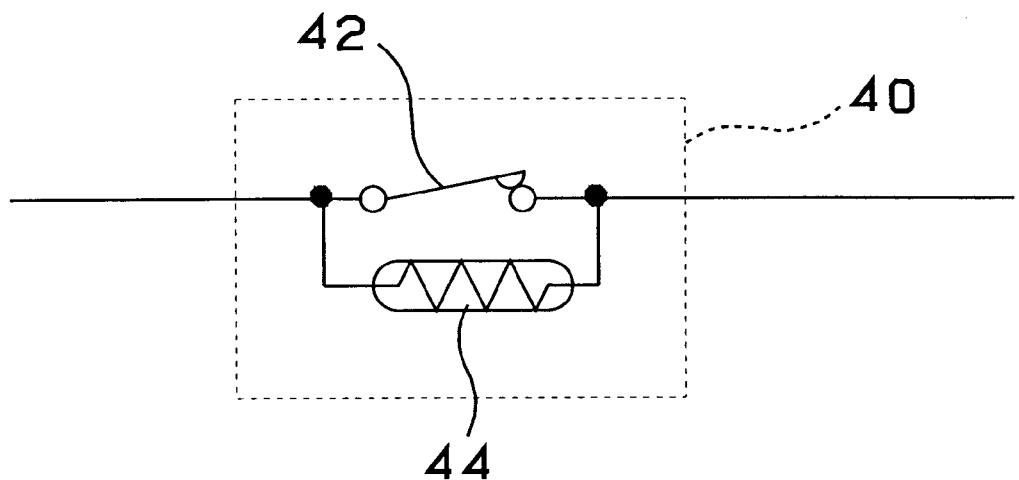
FIG. 6A is a schematic illustration showing the contact-condition of a bimetal of a self-holding type protector in a circuit shown in FIG. 4.
Figure 6B:
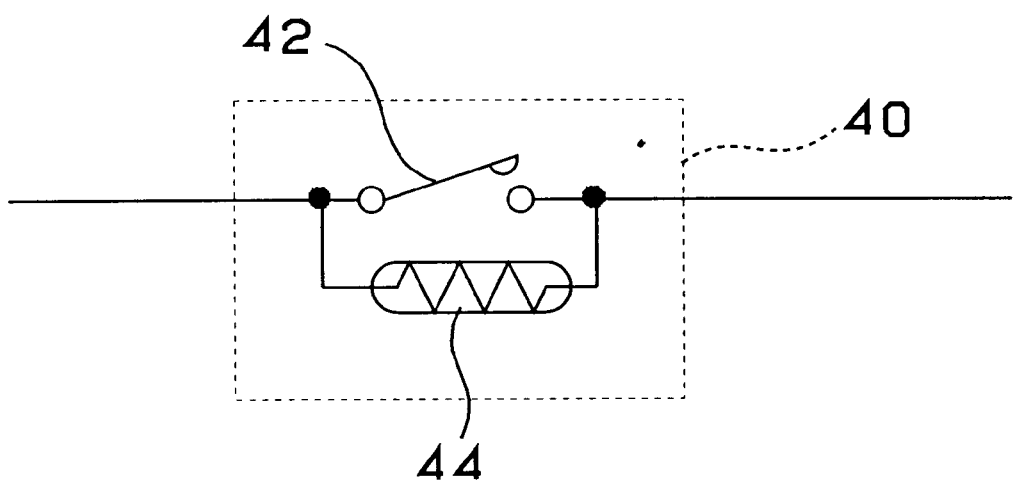
FIG. 6B is a schematic illustration showing a off-condition of a bimetal of a self-holding type protector.

Configuration and operation of the self-holding type protector which detects heat due to over-charge of battery pack 50 and an over-current due to a short-circuit of one or more batteries of battery pack 50 will now be explained with reference to FIGS. 6A and 6B. FIG. 6A is a schematic drawing showing a contact-condition of a bimetal element of a self-holding type protector in a circuit shown in FIG. 4. FIG. 6B is a schematic drawing showing an "off" condition of the bimetal element.

Protector 40 comprises a bimetal element 42 accommodated in a container (not shown), and a positive characteristic thermistor (PCT) 44. Protector 40 and PCT 44 are electrically connected in parallel circuit. When electric current flows through bimetal 42 above a predetermined level, bimetal 42 opens as shown in FIG. 6B. Bimetal 42 becomes open in the same way when it is heated above a predetermined temperature.

When bimetal 42 is closed so that it is in a contact-condition as shown in FIG. 6A, a small amount of current flows through PCT 44 because the resistance of bimetal 42 is lower than that of PCT 44. When bimetal 42 opens, as shown in FIG. 6B, there is a relatively large flow of current through PCT 44. This raises the temperature of PCT 44. Heat generated by PCT 44, causes bimetal 42 to be heated and remain "open". Thus protector 40 is self-holding in its "open" or "off" condition.

Figure 4:
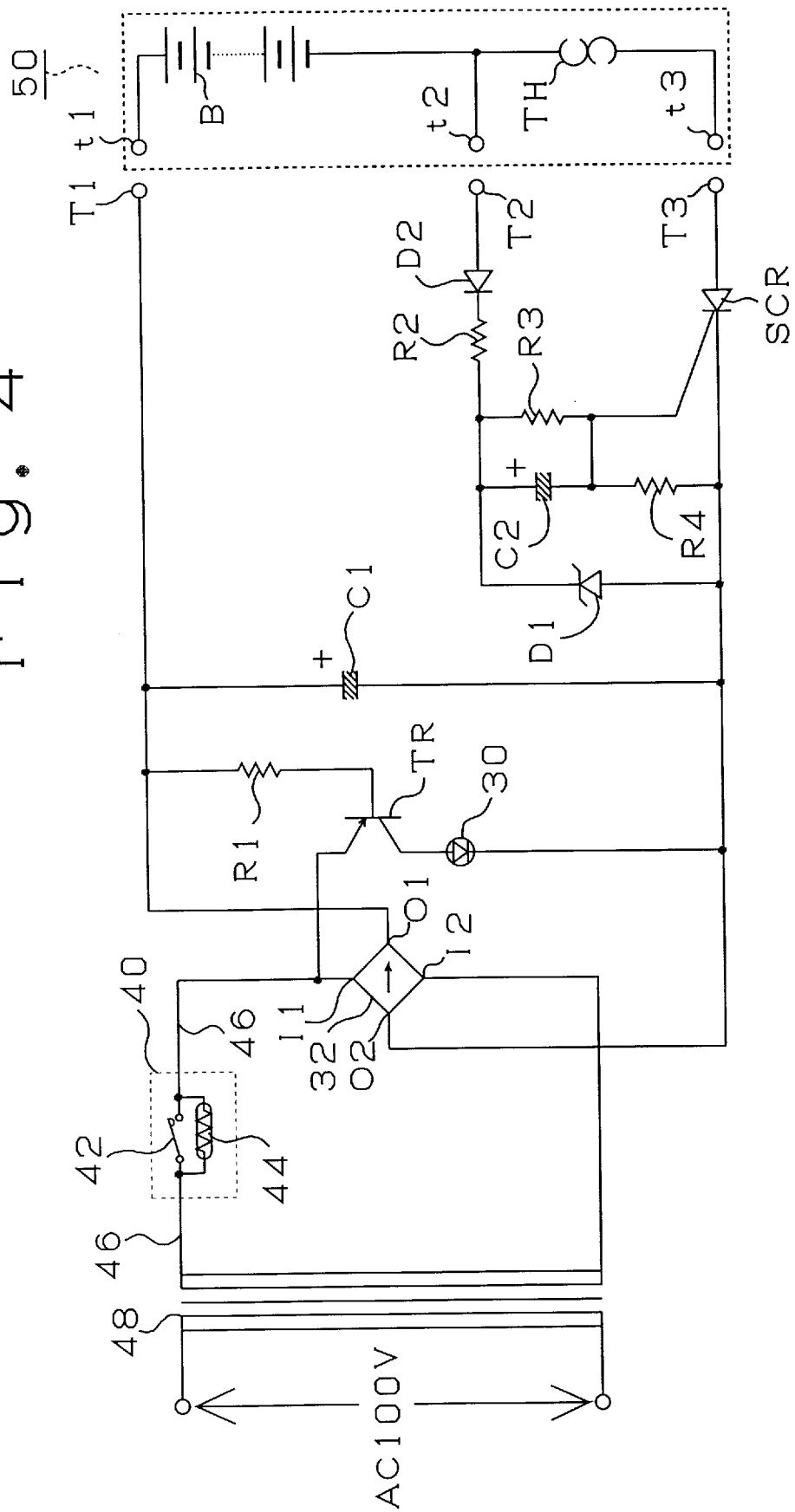
FIG. 4 is a circuit diagram showing a circuit composition of a battery charger shown in FIG. 1.
Figure 5A:
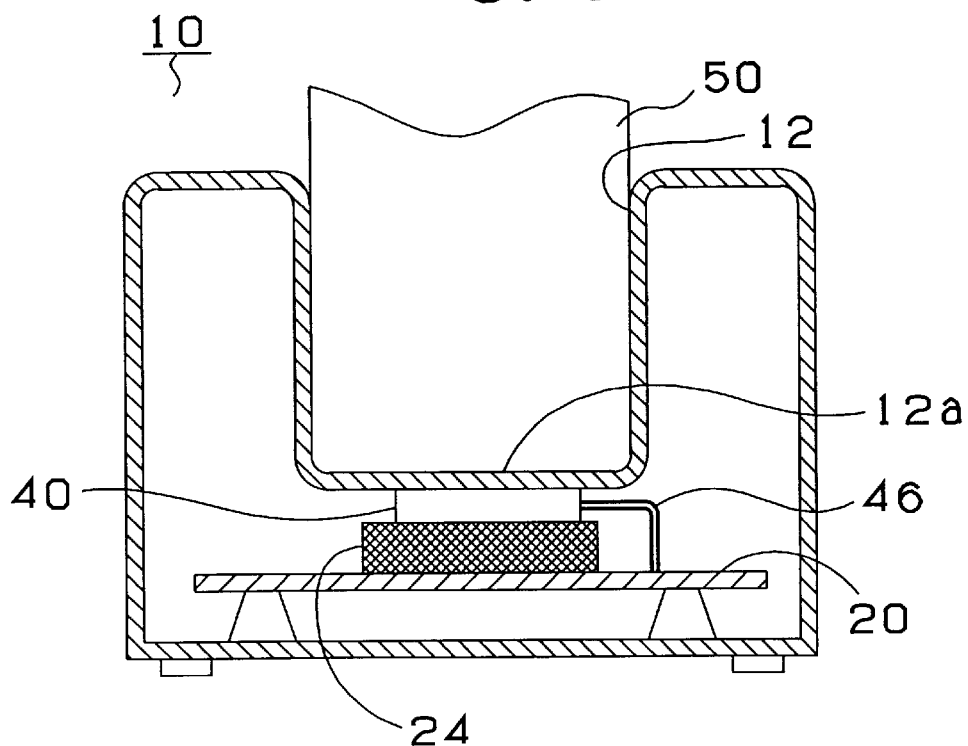
FIG. 5A is a sectional view of a battery charger taken along line 5—5 of FIG. 1.

The arrangement and use of protector 40 will be explained in detail with reference to FIG. 5A. FIG. 5A shows a section of battery charger 10 along line 5—5 in the FIG. 1. FIG. 5A shows a battery pack 50 accommodated in inserting hole 12 of battery charger 10. A circuit board 20 having a circuit shown schematically in FIG. 4 is accommodated in battery charger 10. A sponge 24 having flexibility is placed at the top surface of circuit board 20. Protector 40 is pinched between the sponge 24 and a bottom 12a of inserting hole 12. That is, by pressing self-holding type protector 40 against bottom 12a of the inserting hole 12 with the sponge 24 having flexibility, even if bottom 12a is transformed when battery pack 50 is loaded within the inserting hole 12, sponge 24 may absorb this transformation to protect the breakdown of self-holding type protector 40 caused by application of the excessive power of the transformation. Protector 40 is connected to circuit board 20 through a lead line 46.

By pressing protector 40 against bottom 12a of inserting hole 12 with the sponge 24, heat generated by battery pack 50 is efficiently conducted to protector 40. Protector 40 is supported by sponge 24 which has porosity and acts as an insulating material. Therefore, heat does not easily transfer to circuit board 20 and causes protector 40 to operate quickly. Sponge 24 is used mechanically as an elastic member which presses protector 40 to the bottom 12a. Alternatives to the use of a sponge 24 would be to use rubber or a synthetic resin.

Construction of the battery pack 50 and battery charger 10 will be explained with reference to FIG. 4. Battery pack 50 accommodates 6 nickel-cadmium storage batteries B which generate about 7.2V, and a thermostat TH which opens due to a high temperature caused by the completion of charging of batteries B. Battery pack 50 has a first input terminal t1 connected with the positive terminal of the a storage battery B, a second input terminal t2 connected with the negative terminal of battery B, and third terminal t3 connected with the negative terminal of battery B through the thermostat TH.

Battery charger 10 has a rectifying power supply which rectifies commercial electric AC power (110V) to provide a direct current at about 10V. It applies a positive voltage to first output terminal T1 and negative voltage to the third output terminal T3. Battery charger 10 drops the voltage of commercial electric AC power using a transformer 48, and applies the lower voltage power to a diode-bridge 32. Protector 40 is placed in circuit between transformer 48 and diode-bridge 32 to protect from over-charging of the battery pack 50 and any over-current condition caused by a short-circuit in battery pack 50.

A first output terminal O1 of the diode-bridge 32 is connected with terminal T1. A second output terminal O2 of diode-bridge 32 is connected with third output terminal T3 through a thyristor silicon-controlled rectifier (SCR), and applies a rectified direct current electric potential of 10V between both terminals. The first and second terminals O1,O2 are connected to a capacitor C1. An input terminal I1 of diode-bridge 32 is connected to one side of protector 40 and to an emitter of a transistor TR. A base of transistor TR is connected through a resistor R1 to output terminal O1 of diode-bridge 32. When battery charger electric current flows from the diode-bridge 32 to battery pack 50, a forward direction voltage drop between input terminal I1 and output terminal O1 of the diode-bridge 32 becomes larger than the voltage drop of transistor TR. Therefore, transistor TR turns ON and supplies current, and LED lamp 30, explained with referring to FIG. 1, turns on.

Until the thermostat TH of battery pack 50 becomes "open", current flows from battery pack 50 to the thyristor SCR connected to terminal T3. Electric current from terminal T2 flows into the gate of the thyristor SCR through a resistor R2, a diode D2 and a capacitor C2. Thyristor SCR is biased so as to be conductive so that battery charging current to battery pack 50 keeps flowing. A resistor R3 is connected to capacitor C2 in parallel. A resistor R4 is connected to capacitor C2 in series. A constant-voltage diode D1 is connected to capacitor C2 and resistor R4 in parallel.

When battery pack 50 becomes fully charged, the temperature of the storage battery pack rises, and thermostat TH opens. Once thermostat TH opens, voltage is no longer applied to terminal T3, and thyristor SCR becomes non-conductive. Current flow to the battery pack 50 stops. When this current flow stops, capacitor C2 is charged by current from diode D2. Then, even if thermostat TH cools and closes again current will not flow to battery pack 50. Because capacitor C2 is charged, electric current from the terminal T2 stops flowing into the gate of the thyristor SCR, and it is prevented from reopening.

Now we will examine the conditions that occur when thermostat TH doesn't open even when battery pack 50 becomes hot. This can occur when thermostat TH is defective. Even if thermostat TH does not operate, bimetal 42 of the self-holding type protector 40, arranged in the above-mentioned position shown in FIG. 5A, becomes open, when storage battery pack 50 becomes high temperature (about 80° C.). In the case where bimetal 42 opens, as shown in FIG. 6B, electric current flows to PCT 44, and the temperature of the PCT rises. The bimetal 42 heats due to the temperature of PCT 44 and maintains its open (off) condition. Electric current flows to PCT 44 when bimetal 42 is open. However, because the resistance of PCT 44 increases due to the higher temperature, only a small current, necessary to maintain the open condition of bimetal 42, flows to the thermistor 44.

On the other hand, when a storage battery B of battery pack 50 short-circuits, the voltage of the storage battery pack 50 falls lower than 7.2V. For example, it may fall to 6V, or 4.8V, and current through the battery pack 50 increases. When current through battery pack 50 becomes large, the temperature of bimetal 42 rises and bimetal 42 opens. Therefore, charging of battery pack 50 stops and is maintained off in the same way in the case where bimetal 42 opens due to an over-charge condition.

After that, when battery pack 50 is removed from battery charger 10 or when outlet (not shown) of the battery charger 10 is removed from the power supply socket (not shown), the small current flowing to battery pack 50 through PCT 44 of protector 40 is stopped. Thus, PCT 44 cools, the contact point of the bimetal 42 is reset and self-holding type protector 40 is reset.

Figure 5B:
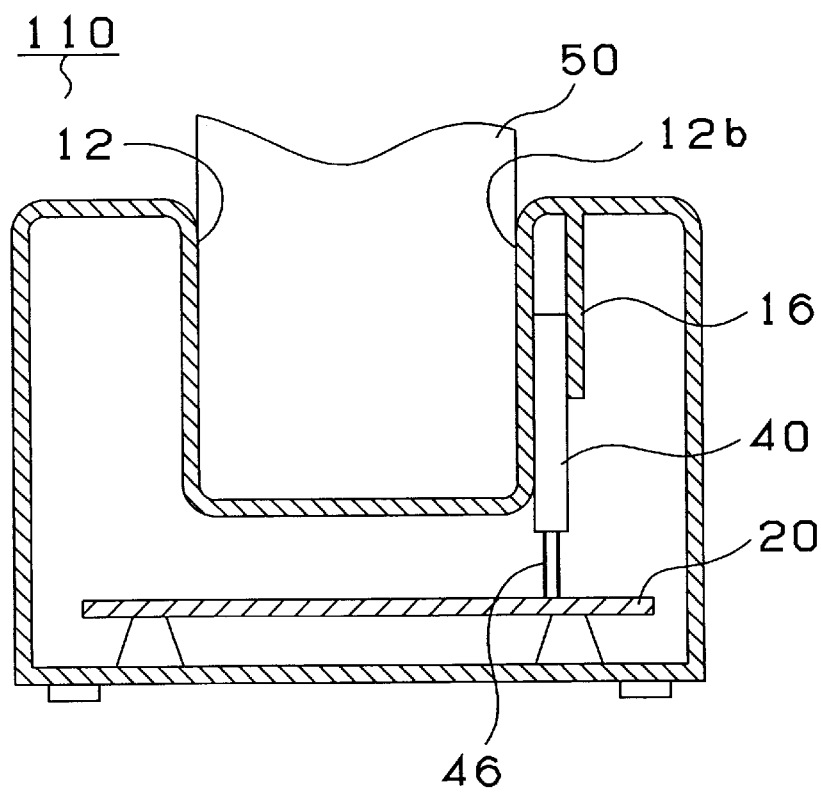
FIG. 5B is a sectional view of a battery charger according to a second embodiment of the invention.

A second embodiment of a battery charger 110 according to the present invention will now be explained with reference to FIG. 5B. In this second embodiment, a vertical wall 16 is formed along a side wall 12b of inserting hole 12 of battery charger 110. A self-holding type protector 40 is accommodated between side wall 12b and vertical wall 16. By arranging protector 40 adjoined to side wall 12b, heat generated by battery pack 50 efficiently conducts to protector 40.

As for the above-mentioned embodiments, a certain circuit composition is given with referring to FIG. 4, however, the self-holding type protector of this invention can be used for various battery chargers except for the constant-current type. Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments, but should be determined by reference to the claims that follow.

What is clamed is:

1. A battery charger, comprising:
    a casing defining an inserting hole for inserting a battery pack having battery charging terminals and a thermostat;
    first terminals arranged in the inserting hole for making contact with the battery charging terminals inserted therein;
    a power supply for supplying direct current at a predetermined voltage;
    means for applying the direct current to the first terminals for charging the battery pack;
    a self-holding type protector element comprising a single part, positioned in proximity to the inserting hole, the protector element including a first element and a second element that are electrically connected in parallel, the first element being electrically open when its temperature rises above a predetermined value, when an electric current flows therethrough above a predetermined amount, when its temperature rises due to failure of the thermostat in the battery pack, or when an electric current flows therethrough above a predetermined amount due to short-circuit of the battery in the battery pack, the second element being arranged so as to maintain an open condition of the first element when a small electric current flows through the second element, the protector element being electrically connected in the power supply.

2. A battery charger according to claim 1, wherein the protector element is pressed to the bottom of the inserting hole.

3. A battery charger according to claim 1, wherein the protector element is arranged along a side wall of the inserting hole.

* * * * *